United States Patent Office 3,325,526
Patented June 13, 1967

3,325,526
THIOSULFATE COMPOUNDS AND METHOD FOR THEIR PRODUCTION
Roger D. Westland and John R. Dice, Ann Arbor, Mich., assignors to Parke, Davis & Company, Detroit, Mich., a corporation of Michigan
No Drawing. Filed June 1, 1965, Ser. No. 460,463
8 Claims. (Cl. 260—453)

The present invention relates to new organic thiosulfate compounds and to methods for their production. More particularly, the invention relates to new S-2-(1-alkylguanidino)ethyl thiosulfate compounds, having in the free acid form the formula,

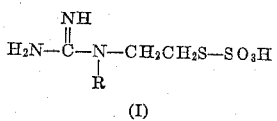

(I)

and to pharmaceutically-acceptable salts thereof; where R is a straight-chain or branched-chain alkyl radical having from 7 to 12 carbon atoms.

In accordance with the invention S-2-(1-alkylguanidino)ethyl thiosulfate compounds having the above formula and salts thereof are produced by the reaction of a 1,1′-(dithiodiethylene)bis-(1-alkylguanidine) compound, having the formula,

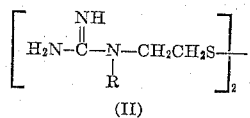

(II)

or a mineral acid salt thereof, with a salt of sulfurous acid in the presence of an oxidizing agent in an unreactive solvent medium; where R is as defined previously. Because of their greater stability, mineral acid salts of the 1,1′-(dithiodiethylene)bis-(1-alkylguanidine) compounds of Formula II above are preferred for use in this reaction. Salts of sulfurous acid that may be used in the reaction include ammonium sulfite, ammonium bisulfite, alkali metal sulfites, alkali metal bisulfites, alkaline earth metal sulfites, and alkaline earth metal bisulfites. When an alkali metal salt of sulfurous acid is employed, an alkali metal bisulfite is preferred over an alkali metal sulfite. The highly preferred sulfurous acid salt is freshly-prepared ammonium sulfite. Oxidizing agents that may be used are air, oxygen, cupric ion, iodosobenzoate ion, and tetrathionate ion. The sulfurous acid salt employed in the reaction also can function as the required oxidizing agent, in which case an additional oxidizing agent is not required. The preferred oxidizing agent, however, is air, and the reaction is most conveniently carried out by bubbling air through the reaction mixture containing the disulfide compound and salt of sulfurous acid until oxidation is complete. Solvents that may be employed in the reaction are water and lower alkanols, such as methanol, ethanol, and isopropyl alcohol, as well as mixtures of these. A preferred solvent is aqueous methanol. The temperature of the reaction is not critical and may be varied. For convenience, with the use of air as the oxidizing agent, the reaction can readily be carried out at room temperature. The duration of the reaction is likewise not critical, and may be varied from about 5 hours to 48 hours, depending on the method of oxidation employed. When air is used as the oxidizing agent as described above, the oxidation is normally complete after a period of 10–20 hours. To insure complete reaction, the chosen salt of sulfurous acid is employed in large excess, that is, approximately 10 to 15 moles or more of sulfurous acid salt is used for each mole of 1,1′-(dithiodiethylene)bis-(1-alkylguanidine) compound. The oxidizing agent employed is added in an amount sufficient to effect complete oxidation.

When ammonium sulfite is used in the foregoing reaction, the product obtained is an S-2-(1-alkylguanidino)ethyl thiosulfate compound in the free acid form, that is, a compound having Formula I. When an alkali metal bisulfite is employed, the product obtained is an alkali metal salt of an S-2-(1-alkylguanidino)ethyl thiosulfate compound having Formula I. In the latter case, it is desirable to neutralize the excess alkali metal bisulfite with the corresponding alkali metal hydroxide prior to isolation of the S-2-(1-alkylguanidino)ethyl thiosulfate alkali metal salt.

The mineral acid salts of the 1,1′-(dithiodiethylene)bis-(1-alkylguanidine) compounds having Formula II, which are the preferred starting materials in the foregoing process, are prepared by reacting a 2-(alkylamino)-ethanethiol compound having the formula

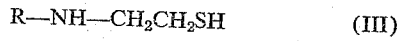

with a mineral acid salt of a reactive guanyl compound, such as 2-methyl-2-thiopseudourea hemisulfate, and oxidizing the 1-alkyl-1-(2-mercaptoethyl)guanidine salt obtained with air in an alkanolic solvent, such as methanol.

The compounds of the invention are useful pharmacological agents. They are anti-bacterial agents that are active both in vitro and in vivo against various strains of Staphylococcus and Streptococcus organisms. They are also anti-parasitic agents that are active in vitro against *Trichomonas vaginalis*. They can be used either in the free acid form, having Formula I above, or in the form of a pharmaceutically-acceptable salt formed with an alkali metal hydroxide, an alkali metal carbonate, an alkali metal alkoxide, or an alkaline earth metal hydroxide. In the free acid form the compounds of the invention exist as internal salts that may also be represented by the formula

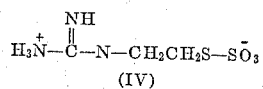

(IV)

where R is as defined earlier. Pharmaceutically-acceptable salts of the S-2-(1-alkylguanidino)ethyl thiosulfate compounds of the invention are prepared as described above or by reaction of the S-2-(1-alkylguanidino)ethyl thiosulfate compounds in the free acid form with a dilute solution of an equivalent amount of an alkali metal hydroxide, an alkali metal carbonate, an alkali metal alkoxide, or an alkaline earth metal hydroxide in an unreactive solvent, such as water or methanol. The preferred pharmaceutically-acceptable salts are the salts of an alkali metal, which are preferably prepared by reacting the S-2-(1-alkyl-guanidino)ethyl thiosulfate compounds in free acid form with an equivalent amount of an alkali metal alkoxide in a lower alkanol solvent.

The invention is illustrated by the following examples:

Example 1

To a solution of 10.6 g. of 1,1'-(dithiodiethylene)-bis-(1-n-heptylguanidine) sulfate in 100 ml. of methanol is added 350 ml. of 10% aqueous ammonium sulfite solution (freshly prepared by bubbling sulfur dioxide into water and neutralizing the resulting solution with concentrated ammonium hydroxide), and air is passed through the resulting solution at room temperature for 16 hours. The mixture is then evaporated to dryness under reduced pressure, and the residue is extracted with boiling methanol. The hot methanolic extract is filtered, and the filtrate is evaporated to dryness under reduced pressure. The solid S-2-(1-n-heptylguanidino)ethyl thiosulfate obtained is washed with water, dried, and crystallized from methanol; M.P. 175–178° C.

The potassium salt of S-2-(1-n-heptylguanidino)ethyl thiosulfate is obtained by treating a methanolic solution of 2.0 g. of S-2-(1-n-heptylguanidino)ethyl thiosulfate at room temperature with an equivalent amount of 10% aqueous potassium hydroxide, evaporating the resulting mixture to dryness under reduced pressure, and crystallizing the solid salt obtained from methanol.

The 1,1'-(dithiodiethylene)bis - (1-n-heptylguanidine) sulfate used as a starting material in the foregoing procedure is prepared as follows. A solution of 17.5 g. of 2-(n-heptylamino)ethanethiol in 200 ml. of methanol is added dropwise at room temperature to a stirred solution of 13.9 g. of 2-methyl-2-thiopseudourea hemisulfate in 100 ml. of water. The reaction mixture is kept at room temperature for 18 hours more, and the precipitate of 1-n-heptyl-1-(2-mercaptoethyl)guanidine hemisulfate that forms is isolated by filtration; M.P. 204–207° C. This salt (10 g.) is dissolved in 2000 ml. of methanol, and air is bubbled through the solution for 48 hours. The solution is then evaporated to dryness under reduced pressure and the solid 1,1'-(dithiodiethylene)bis-(1-n-heptylguanidine) sulfate obtained is crystallized from methanol.

Example 2

To a solution of 11.2 g. of 1,1'-(dithiodiethylene)-bis-(1-n-octylguanidine) sulfate in 100 ml. of methanol is added 350 ml. of a freshly-prepared 10% aqueous ammonium sulfite solution, and air is passed through the resulting solution at room temperature for 16 hours. The mixture is then evaporated to dryness under reduced pressure, and the residue is extracted with boiling methanol. The hot methanolic extract is filtered, and the filtrate is evaporated to dryness under reduced pressure. The solid S - 2 - (1 - n - octylguanidino)ethyl thiosulfate obtained is washed with water, dried, and crystallized from methanol; M.P. 128–130° C.

The sodium salt of S-2-(1-n-octylguanidino)ethyl thiosulfate is prepared by treating a methanolic solution of 2.0 g. of S-2-(1-n-octylguanidino)ethyl thiosulfate at room temperature with an equivalent amount of sodium methoxide, evaporating the resulting mixture to dryness under reduced pressure, and crystallizing the solid salt obtained from methanol.

The 1,1'-(dithiodiethylene)bis-(1-n-octylguanidine) sulfate used as a starting material in the foregoing procedure is prepared according to the procedure described in Example 1 above for the preparation of 1,1'-(dithiodiethylene)bis-(1-n-heptylguanidine) sulfate, with the substitution of 18.9 g. of 2-(n-octylamino)ethanethiol for the 2-(n-heptylamino)ethanethiol in the first step and 10 g. of 1-(2-mercaptoethyl)-1 - n - octylguanidine hemisulfate for the 1-n-heptyl-1-(2-mercaptoethyl)guanidine hemisulfate in the second, oxidation step.

Example 3

To a solution of 11.7 g. of 1,1'-(dithiodiethylene)bis-(1-n-nonylguanidine) sulfate in 100 ml. of methanol is added 350 ml. of a freshly-prepared 10% aqueous ammonium sulfite solution, and air is passed through the resulting solution at room temperature for 16 hours. The resulting mixture is then evaporated to dryness under reduced pressure, and the residue is extracted with boiling methanol. The hot methanolic extract is filtered, and the filtrate is evaporated to dryness under reduced pressure. The solid S - 2 - (1 - n - nonylguanidino)ethyl thiosulfate obtained is washed with water, dried, and crystallized from methanol; M.P. 149–152° C.

By utilizing the foregoing procedure, the following S-2-(1-alkylguanidino)ethyl thiosulfate compounds are prepared from the reaction of the specified 1,1'-(dithiodiethylene)bis-(1-alkylguanidine) sulfate with ammonium sulfite in the presence of air as an oxidizing agent:

(a) From the reaction of 1,1'-(dithiodiethylene)bis-(1-n-decylguanidine) sulfate there is obtained S-2-(1-n-decylguanidino)ethyl thiosulfate; M.P. 152–154° C., following crystallization from methanol.

(b) From the reaction of 1,1'-(dithiodiethylene)bis-(1-n-undecylguanidine) sulfate there is obtained S-2-(1-n-undecylguanidino)ethyl thiosulfate.

(c) From the reaction of 1,1'-(dithiodiethylene)bis-(1-n-dodecylguanidine) sulfate there is obtained S-2-(1-n-dodecylguanidino)ethyl thiosulfate.

(d) From the reaction of 1,1'-(dithiodiethylene)bis-[1-(2-ethylhexyl)guanidine] sulfate there is obtained S-2-[1-(2-ethylhexyl)guanidino]ethyl thiosulfate.

Each of the 1,1'-(dithiodiethylene)bis-(1-alkylguanidine) sulfate compounds used as a starting material in the foregoing procedure can be prepared according to the procedure described in Example 1 above for the preparation of 1,1'-(dithiodiethylene)bis-(1 - n - heptylguanidine) sulfate, with the substitution of the appropriate 2-(alkylamino)ethanethiol for the 2 - (n - heptylamino)-ethanethiol in the first step and the appropriate 1-alkyl-(2-mercaptoethyl)guanidine hemisulfate for the 1-n-heptyl-1-(2-mercaptoethyl)guanidine hemisulfate in the second, oxidation step.

We claim:

1. A member of the class consisting of S-2-(1-alkylguanidino)ethyl thiosulfate compounds, having in the free acid form the formula

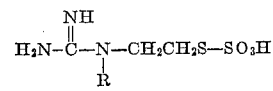

and pharmaceutically-acceptable salts thereof; where R is a member of the class consisting of straight-chain and branched-chain alkyl radicals having from 7 to 12 carbon atoms.

2. S-2-(1-alkylguanidino)ethyl thiosulfate compounds having the formula

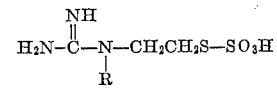

where R is a member of the class consisting of straight-chain and branched-chain alkyl radicals having from 7 to 12 carbon atoms.

3. S-2-(1-n-heptylguanidino)ethyl thiosulfate.
4. S-2-(1-n-octylguanidino)ethyl thiosulfate.
5. S-2-(1-n-nonylguanidino)ethyl thiosulfate.
6. S-2-(1-n-decylguanidino)ethyl thiosulfate.
7. Process for the production of a member of the class consisting of S - 2 - (1 - alkylguanidino)ethyl thiosulfate compounds, having in the free acid form the formula,

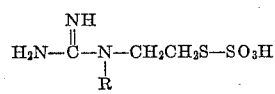

and pharmaceutically-acceptable salts thereof, which comprises the reaction of a member of the class consisting of a 1,1'-(dithiodiethylene)bis-(1-alkylguanidine) compound, having the formula,

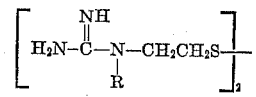

and a mineral acid salt thereof with a salt of sulfurous acid in the presence of an oxidizing agent in an unreactive solvent medium; where R is a member of the class consisting of straight-chain and branched-chain alkyl radicals having from 7 to 12 carbon atoms.

8. Process for the production of S-2-(1-alkylguanidino)ethyl thiosulfate compounds, having the formula,

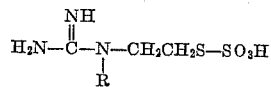

which comprises the reaction of a mineral acid salt of a 1,1′ - (dithiodiethylene)bis - (1 - alkylguanidine) compound, having the formula,

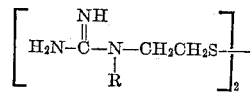

with ammonium sulfite in the presence of air in an unreactive solvent medium; where R is a member of the class consisting of straight-chain and branched-chain alkyl radicals having from 7 to 12 carbon atoms.

No references cited.

CHARLES B. PARKER, *Primary Examiner.*

J. P. BRUST, *Assistant Examiner.*